Nov. 11, 1941.    H. F. WATERS    2,262,480
THERMAL SEALING MACHINE
Filed July 20, 1940    2 Sheets-Sheet 1

INVENTOR.
HARRY F. WATERS
BY Nicholas Lauzer
ATTORNEY

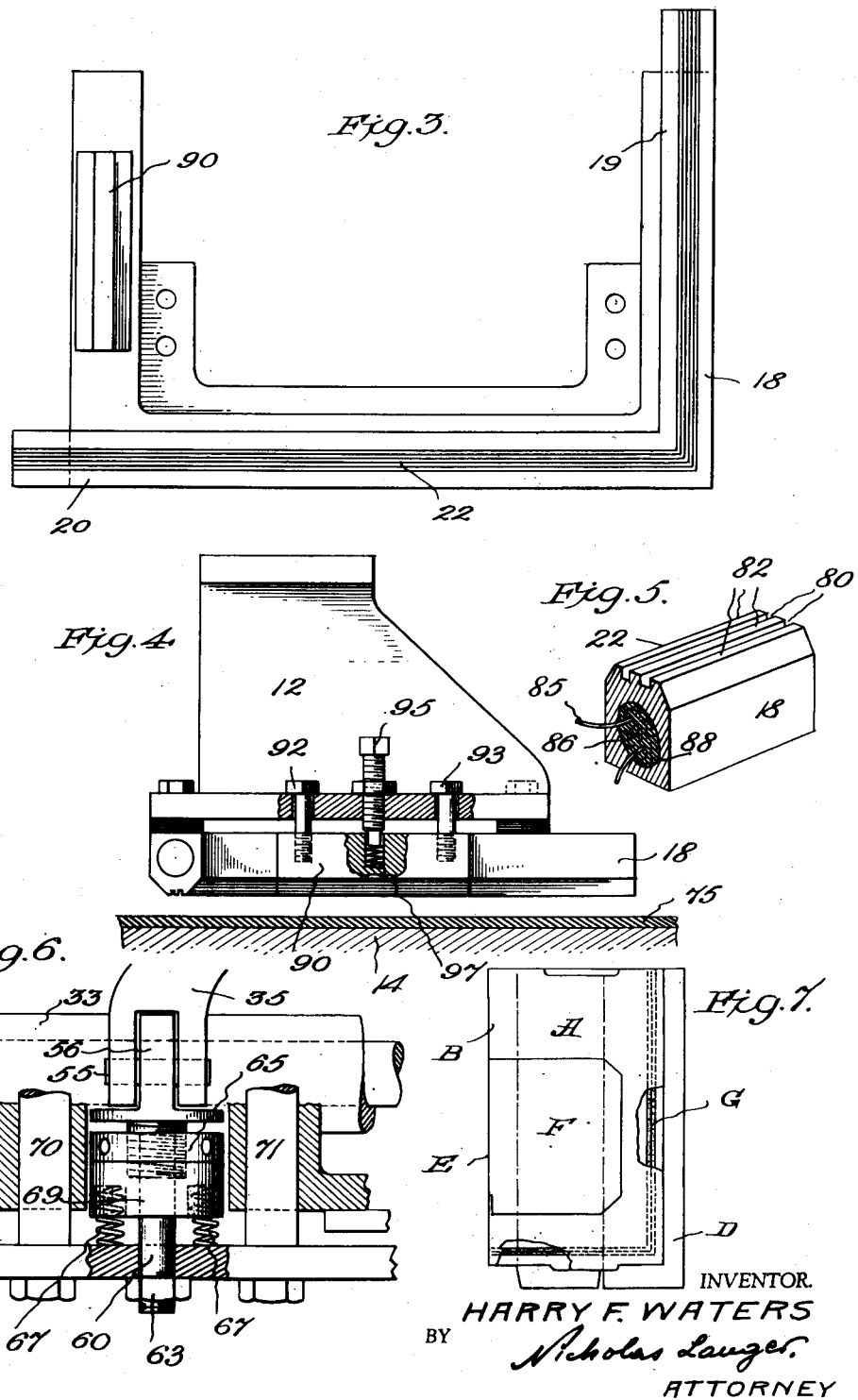

Patented Nov. 11, 1941

2,262,480

UNITED STATES PATENT OFFICE 2,262,480

THERMAL SEALING MACHINE

Harry F. Waters, New York, N. Y.

Application July 20, 1940, Serial No. 346,515

7 Claims. (Cl. 93—8)

This invention relates to thermal sealing machines, and provides improvements therein.

The present invention provides a special machine for making bags. It provides a machine which when used in a particular manner upon a folded sheet of suitable material forms at one operation, a continuous seam at the marginal portions of the folded sheet along one side and one end, thereby, in conjunction with the fold, producing a bag closed at three sides and open at one end.

The sheet material for forming a bag may be a sheet of thermoplastic material, as for example, "Pliofilm," or of another material as paper having a strip or band of a thermoplastic substance or adhesive at the place where the seam is to be made. Sheets of cellulose ester material, vinyl resin material, or of paper coated therewith are examples of other sheet material.

The invention further provides a sealing machine capable of producing a continuous seam on a folded sheet for forming a bag having a special assembly within a folded piece of cardboard or the like for forming a carton or case, said continuous seam, in conjunction with the fold in the bag-forming sheet, forming the bag at one operation.

The invention further provides a machine and method which is capable of forming a continuous substantially L-shaped seam on a sheet of folded material, and of producing such a seam of substantially uniform strength throughout, durable, and tight throughout. The performance of the machine is such that a bag formed from a folded sheet of a thermoplastic material, such as Pliofilm, or a folded sheet of paper lined or striped with a thermoplastic material, is tight at the seam so as to reliably confine its contents, including liquids and gases.

An embodiment of the invention is illustrated in the accompanying drawings, wherein:

Fig. 3 is a bottom plan view, on an enlarged scale, of the sealing bar.

Fig. 4 is a view partly in vertical section and partly in side elevation, illustrating the sealing bar shown in Fig. 3, mounted on the head or slide which carries it, and in position over a platen or backing member.

Fig. 5 is an enlarged detail view illustrating the sealing bar in perspective and in cross-section, and showing a part of an electrical resistance heater, by means of which the sealing bar is heated.

Fig. 6 is a detailed view illustrating a resilient connection between the slide which carries the sealing bar and the means for reciprocating the slide.

Fig. 7 is a top plan view of one special assembly of bag-forming material and carton-forming material on which the sealing machine is adapted to operate to form the bag at one seaming operation.

Figure 1:
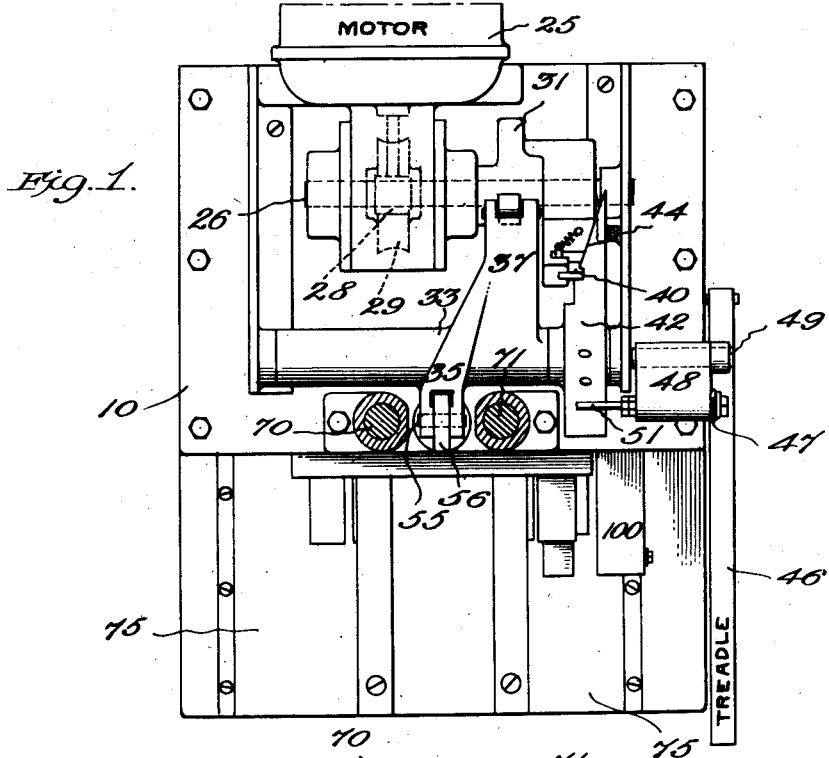
Fig. 1 is a top plan view of the machine.
Figure 2:
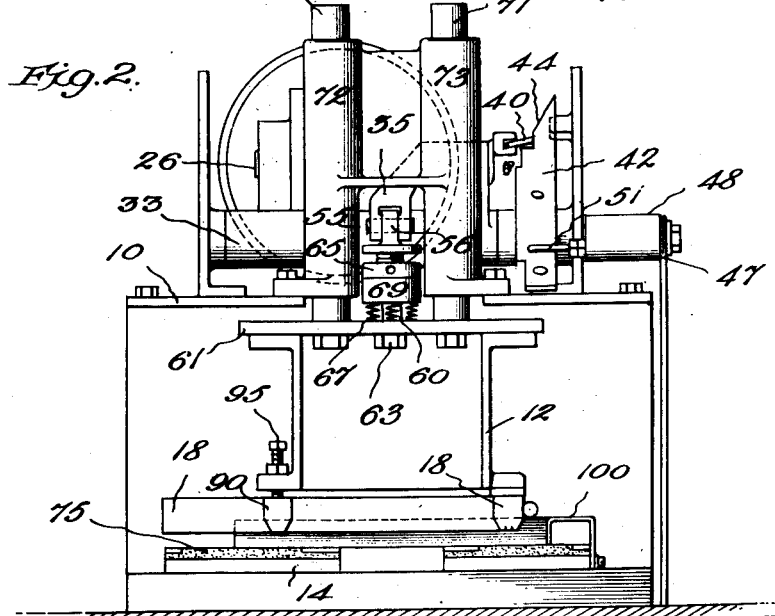
Fig. 2 is a front elevation.

Referring to said drawings, numeral 10 designates any suitable frame on which there is a head or slide 12, a platen or backing member 14, and suitable means for reciprocating the head or slide 12. Numeral 18 designates the sealing-bar comprising two legs 19 and 20 at substantially right angles to one another and having a continuous work-contacting face 22. The sealing bar 18 is attached to the head or slide 12. The slide 12 with the sealing bar 18 are reciprocated toward and from the platen or backing member to operate on work placed between the sealing bar and the platen. Any suitable means may be provided for reciprocating the head or slide 12. A simple and advantageous means for reciprocating the slide 12 is shown in the drawings, and comprises a motor 25 driving a shaft 26 through reduction gears 28, 29. On the shaft 26 is fixed a part for translating the rotary movement of the shaft to reciprocatory movement, here shown as a cam 31. Numeral 33 designates a rock-shaft having an arm 35 connected to the slide 12, and another arm 37 in coactive relation with the cam 31. A spring latch 40 mounted in the sleeve of the cam 31 may be provided for connecting and disconnecting the cam 31 to the shaft 26. The latch 40 may be controlled to connect and disconnect the cam 31 from the shaft 26 through a suitable operating mechanism, one form of which is shown. It comprises an oscillatory arm 42 having a wedge or inclined plane 44 for coacting with the latch 40. The arm 42 normally rests in a position where its inclined face 44 is in position to contact with the latch 40 and disconnect it from the shaft 26. To release the latch 40 so as to connect the cam 31 with shaft 26, the arm 42 is rocked upward to move it out of contacting position with the latch 40 by suitable means, as a treadle 46, treadle rod 47, lever 48, pivoted at 49 and a pin 51, positioned, when brought in contact with the arm 42, to move the wedge 44 thereon upward out of the path of the latch 40.

The cam 31 acts to hold the slide down and the seaming bar thereon in work-contacting position for a determined length of time, as will be hereinafter more fully described.

The connection of the arm 35 to the slide 12 may be, as here shown, through a pin 55, and an eye 56.

The means for reciprocating the slide advantageously comprises a resilient connection, the resiliency of which may be adjusted. Such a resilient connection may be attained by forming the eye 56 on a bolt 60 (see particularly Fig. 6) which passes through a plate 61 forming a part of the slide, which plate is confined between nuts 63 and 65 on either side thereof. Springs 67 are provided between the nut 65 and the plate 61. A thick washer 69 may be provided between the springs 67 and the nut 65, said washer 69 being advantageously provided with deep recesses for partially housing the springs 67. By turning the nut 65 in one direction or another the tension of the springs 67 may be increased or decreased, and thereby the resilience of the connection between the arm 35 and the slide 12 adjusted.

Means may be provided for guiding the head when in the form of a slide in a straight line in its reciprocatory movement. This guide means may comprise rods 70, 71 fastened to the slide, and long upright sleeves 72, 73 fastened to the machine frame 10.

The platen 14 is advantageously provided with a resilient facing 75, which resilient facing may be a sheet of firm rubber. The resilience of the sheet 75 is advantageously stiff, so that the sheet 75 is firm but slightly yieldable unler pressure of the sealing bar 18.

The sealing bar 18 has a continuous work-contacting face 22, so that the seam formed thereby will be continuous from the end of one leg 19 to the end of the opposite leg 20. For a purpose hereinafter to be described the work-contacting face 22 of the sealing bar (as best shown in Fig. 5) is ribbed; that is, it is provided with one or more grooves 80 running longitudinally of each leg, the grooves in each leg being joined at the angle between the legs. Two or more lands 82 are thereby formed on the work-contacting face of the seaming bar, which lands are continuous from the end of one leg to the end of the other leg.

Means are provided for heating the sealing bar 18. The heating bar is advantageously an electrical heater which may be formed of resistance wires 85 embedded in a suitable insulating material 86 within bores 88 in the legs 19 and 20 of the sealing bar 18.

Numeral 90 designates a pressure equalizing pad. The pad 90 is attached to the frame opposite one of the legs of the sealing bar 18, as for example opposite the leg 19. The pad 90 is designed to contact with the work at the same time that the legs 19 and 20 contact, and thereby counteracting any tendency of the slide to tilt. The slide is thereby maintained in level position when under pressure. To carry out more fully the purpose of maintaining the sealing bar 18 level under pressure, the pad 90 is preferably resiliently connected to the slide 12. To this end the pad 90 may be provided with bolts 92, 93 which pass through holes in the slide 12. The threaded ends of the bolts 92, 93 are attached to the pad 90 and the heads of the bolts act to limit the extension of the pad 90 from the slide. A screw 95 is threaded into the slide between the bolts 92, 93, and a spring 97 is interposed between the end of the screw 95 and the pad 90.

By turning the screw 95 in one direction or another the spring 97 is more or less compressed, and in this way the resilience of the pad is controlled. By adjusting the screw 95, and consequently the resilience of the pad 90, a level bearing of the work-contacting face 22 may be obtained to a nicety. An adjustable pad 90 is important to the proper functioning of the machine, inasmuch as in some uses, the thickness of the material is sometimes either greater or less under the pad than it is under the sealing bar 18, as will appear in a later part of the description.

Numeral 100 designates a guide for positioning the work under the sealing bar 18. The proper positioning of the work is highly important when seaming a sheet for forming a bag assembled with a carton-forming blank.

*Operation*

Referring to Fig. 1, a sheet of material A, folded as indicated at B is placed on the platen 14. The sheet A may be of Pliofilm, or of any other suitable thermoplastic material, or of a suitable paper stock lined or striped with a thermoplastic material. As shown in Fig. 7, the bag-forming sheet A is assembled with a carton blank D folded as indicated at E, the portion F of the carton partially overlying the folded bag-forming sheet A. The seam is indicated by the letter G, and the marginal portion of the folded bag-forming sheet A at which the seam G is formed is exposed to contact with the work-contacting face 22 of the sealing bar 18. The under portion of the carton blank D has cut-out portions, but the assembly is so contrived that along the line of the seam G the folded sheet A is supported by the carton material.

The guide 100 is carefully set so that, particularly with an assembled piece of work as shown in Fig. 7, the work-contacting face 22 makes contact with the exposed margins of the folded bag-forming sheet A along a path where the seam will be over a continuous portion of the cartion material D.

With the folded sheet A (or with the assembly of such sheet with a folded carton blank) properly positioned beneath the sealing bar 18, the seaming bar is brought down on the margins of the sheet, so as to press the marginal portions together between the sealing bar 18, and the backing member or platen 14. Before the machine is put to use, the sealing bar is brought to the proper temperature by the electric heater 85.

The sealing bar 18 is held in pressure-contact with the marginal portions of the folded sheet A a sufficient length of time for the thermoplastic material to soften and to weld the folded sheets together along a line or strip defining the area of the work-contacting face of the sealing bar 18. The sealing bar, as previously stated, has two legs 19 and 20 at substantially right angles, and, in positioning the folded sheet A on the platen, it is placed so that the leg 20 makes contact along the margin opposite the fold B, and the leg 19 makes contact along a margin at right angles to the fold B. The length of the leg 19 is such that it extends across the fold B. The leg 20 ordinarily has a length which extends beyond the folded sheet at the side opposite the fold.

The substantially L-shaped sealing bar having a continuous work-contacting face, and extending across the seam, bears continuously on the folded sheet along one side and one end, and together with the folded side forms a bag closed on three sides and open at one side.

The duration of the pressure-contact of the sealing bar 18 is determined by the contour of the cam 31, this being a matter well within the knowledge of the skilled mechanic.

Inasmuch as sheet material varies somewhat, though very slightly, in thickness over different parts of its surface, and inasmuch as sheet material when thin has great resistance to flow or compression, even under very heavy pressures, I have provided a means whereby an even pressure or pressure-contact may be obtained throughout the length of the work-contacting face 22 of the sealing bar. The sealing bar, on its working face, as previously described, is provided with two or more continuous lands 82 running lengthwise of the bar, (of its two legs) and there is a groove or grooves 80 between the lends. When the work-contacting face of the sealing bar contacts with the folded sheet material, any excess of material, and particularly of the thermoplastic material or lining, under any part of the sealing bar, can, under the pressure of the sealing bar, readily escape to one side or another of the lands, and thereby allow the sealing bar to find an equal resistance or bearing on the folded sheet along its entire length. This will insure an equal seaming, and an equal strength of seam throughout its length.

Contributing to the equal pressure or bearing of the sealing bar 18 along its work-contacting face, with the folded sheet are the resilient facing 75 on the platen or backing member 14, and the resilient connection between the slide 12 and the arm 35 (comprising springs 60), and the pressure pad 90. The springs 60 of the resilient connection give to the slide a very slight floating characteristic whereby the slide will accommodate itself to an equal bearing of the sealing member on the folded sheet. Also by reason of the springs, and their adjustability, both a regulated pressure, and a continuous pressure can be exerted by the sealing bar on the folded sheet, contributing thereby to the formation of a firm and secure seam. The firm rubber facing piece 75 allows an accommodation under the usual slight irregularities either in the paper or in the sealing bar.

The pressure pad 90, equalizes the resistance opposite the leg 19 of the sealing bar, and thereby counteracts any tendency of the slide to tilt. The level action of the sealing bar 18 may be nicely adjusted by turning the screw 95 which bears on the pressure pad 90 through the spring 97. Sometimes there is a portion of the overlying part F of the carton blank D which projects under the position of the pressure pad 90, and sometimes, as shown in Fig. 7, the position of the part F is such that the pressure pad 90 bears on the folded sheet A. By reason of this difference in level under certain working conditions, the action of the pressure pad 90 would be different unless compensated for. This compensation may be effected through the screw 95 and the spring 97 which is interposed between the pad and the screw. Therefore, for different working conditions, the pressure pad 90 may be adjusted so that it will coact with the slide to maintain a strict evenness of pressure-contact of the work-contacting face 22 with the marginal portions of the folded sheet A.

The invention may receive other embodiments than those herein specifically illustrated and described.

What is claimed is:

1. In a heat sealing device for converting in a single operation two layers of flexible material fusible on at least the inner face thereof into a flattened bag closed at three edges and open at one edge, the combination which comprises a heat-sealing member, means for heating said member, means for applying said heated member to predetermined regions of the surface of said flexible material to cause fusion of the surface thereof in such regions, said heat sealing member being constructed and arranged to simultaneously apply heat and pressure along at least two continuously connected marginal strips of sheet, and a pad operatively associated with said heat-sealing member having a work-contacting surface so constructed and arranged as to maintain said member level under working pressure.

2. In a heat sealing device for converting in a single operation a sheet of folded flexible material fusible on at least the inner face thereof into a collapsed bag closed at three edges and open at one edge, the combination which comprises a heat sealing member, means for heating said member, a backing plate for said member, means for applying said heated member to predetermined marginal regions of the surface of said folded sheet to cause fusion of the inner surface thereof in such regions, said heat sealing member having a work-contacting face extending along a continuous marginal strip parallel with a longitudinal and a transverse edge of said folded sheet, and a resiliently mounted unheated pad operatively connected and displaceable with said heat sealing member having a work-contacting surface so constructed and arranged as to maintain said member level under working pressure.

3. In a heat sealing device for converting in a single operation a sheet of folded flexible material fusible on at least the inner face thereof into a collapsed bag closed at three edges and open at one edge, the combination which comprises a reciprocatory slide, a heat-sealing member carried by said slide, means for heating said member, a backing plate for said member, means for reciprocating said slide to apply said heated member to predetermined marginal regions of the surface of said folded sheet to cause fusion of the inner surface thereof in such regions, said heat sealing member having a work-contacting face extending along a continuous marginal strip parallel with a longitudinal and a transverse edge of said folded sheet, a pad on said slide having a work-contacting surface so constructed and arranged as to maintain said heat-sealing member level under working pressure, and means for adjusting the effective level of said pad.

4. A thermal sealing machine comprising a reciprocatory head, a platen or backing member, a substantially L-shaped bar carried by said head and facing said platen and having a continuous work-contacting face, means for heating said bar, means for reciprocating said head so that heat may be applied along an L-shaped path running along one margin and beyond the fold of a folded sheet and along another margin opposite the fold to thereby cause thermoplastic material on the folded sheet to fuse and to form a continuous seam along two margins which together with the fold forms a bag open at one end, and a work-contacting pad on said head opposite one of the legs of said L-shaped bar acting to maintain the head and the bar carried thereby level under working pressure.

5. A thermal sealing machine comprising a reciprocatory head, a platen or backing member, a substantially L-shaped bar carried by said head and facing said platen and having a continuous work-contacting face, means for heating said bar, means for reciprocating said head so that heat may be applied along an L-shaped path running along one margin and beyond the fold of a folded sheet and along another margin opposite the fold to thereby cause thermoplastic material on the folded sheet to fuse and form a continuous seam along two margins which together with the fold forms a bag open at one end, a work-contacting pad on said head opposite one of the legs of said L-shaped bar acting to maintain the head and bar carried thereby level under working pressure, and means for adjusting the effective level of said work-contacting pad to compensate for differences in the thickness of the work at the position where said work contacting pad makes contact with the work.

6. The method of converting sheet material into flattened bags by means of a single application of heat and pressure which comprises folding a sheet of flexible material having a heat-fusible surface on at least one face thereof along a medial line to bring its edges into registering position, and to provide a folded structure open at three edges, and then simultaneously applying heat and pressure to the surface of said folded sheet along a continuous L-shaped marginal strip extending parallel to one of the longitudinal and one of the transverse edges of said sheet to cause fusion of the fusible material of said sheet in said region whereby a continuous uniform L-shaped seam free from re-heated regions and doubled up layers of material will be obtained and said folded sheet will be converted into an envelope closed at three edges and open at one edge.

7. The method of making bags which comprises folding a sheet of flexible heat-sealable material along a single line to bring its longitudinal and its transverse marginal portions into contacting position, and then simultaneously applying heat and pressure to a continuous L-shaped marginal strip of said folded sheet extending in the said longitudinal and in one of said transverse contacting marginal portions whereby said folded sheet will be converted into an open-mouth flattened bag consisting of only two layers of material closed at one edge by means of a fold line and at two edges by means of a continuous L-shaped seam.

HARRY F. WATERS.